Figure 1:
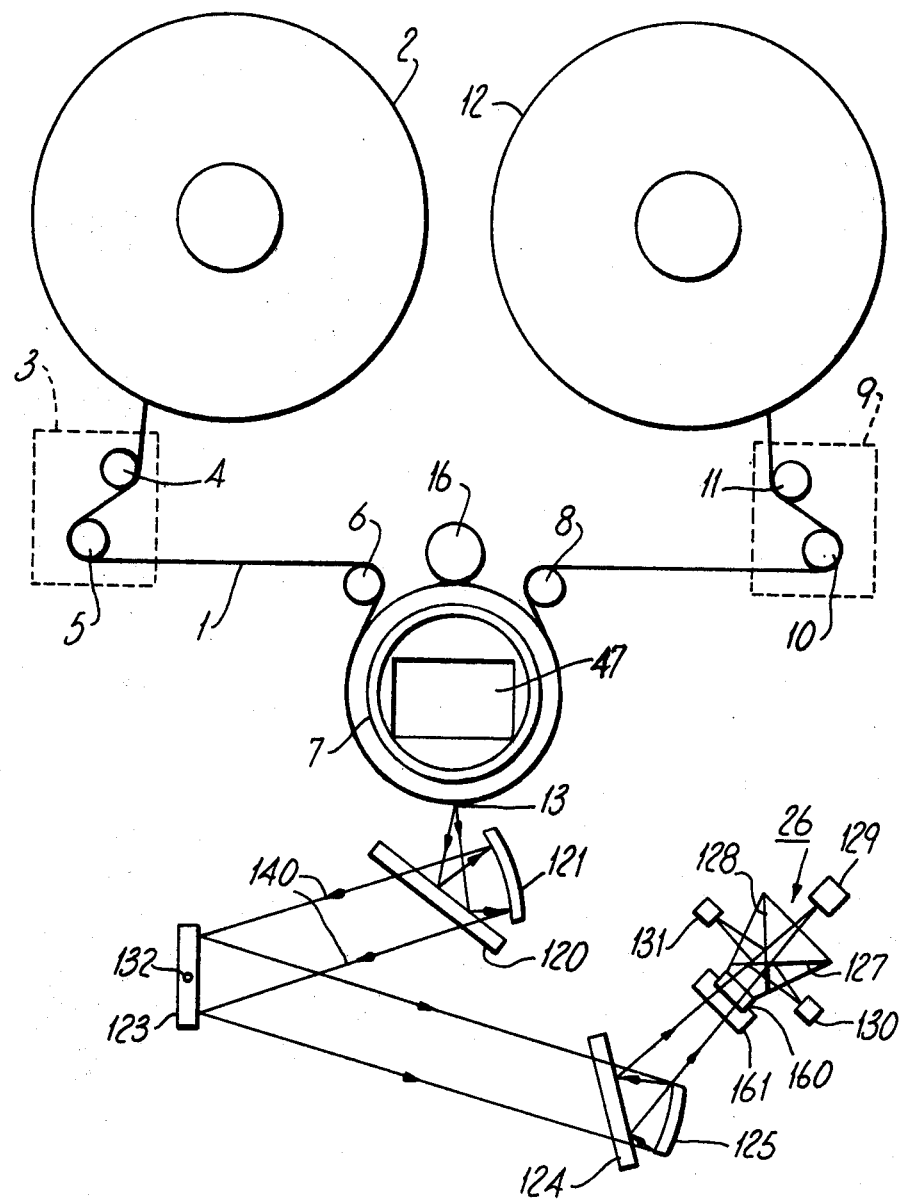

United States Patent [19]
Mackereth et al.

[11] 4,427,273
[45] Jan. 24, 1984

[54] FILM PROJECTION SYSTEM

[75] Inventors: Thomas C. Mackereth, Burwell; Tadeusz Zebrowski, Cambridge, both of England

[73] Assignee: U.S. Philips Corporation, New York, N.Y.

[21] Appl. No.: 323,617

[22] Filed: Nov. 20, 1981

[30] Foreign Application Priority Data

Dec. 8, 1980 [GB] United Kingdom ................ 8039257
Aug. 12, 1981 [GB] United Kingdom ................ 8124617

[51] Int. Cl.³ .............................................. G03B 1/00
[52] U.S. Cl. ...................................... 352/183; 226/74
[58] Field of Search .......................... 352/183; 226/74

[56] References Cited

U.S. PATENT DOCUMENTS 3,421,673 1/1969 Nakamatsu ........................ 352/183
3,938,721 2/1976 Staneck et al. .................... 352/183

FOREIGN PATENT DOCUMENTS 410745 3/1925 Fed. Rep. of Germany ...... 352/183

Primary Examiner—Monroe H. Hayes
Attorney, Agent, or Firm—David R. Treacy

[57] ABSTRACT

A film projection system for use with a continuous film motion telecine machine includes a film guide (17, 18) which guides the film (1) past a gate (13). The film guides (17, 18) form part of two endless bands (14, 15). The parts of the bands (14, 15) in contact with the film (1) are arranged to move at substantially the same velocity as the film and there is provided means (19, 20) for varying the spacing between the bands.

12 Claims, 4 Drawing Figures

FILM PROJECTION SYSTEM

The invention relates to a film projection system including a light source, film transport means for continuously transporting the film past an aperture through which light from the source is directed and a guide for guiding the film in the region of the aperture to maintain a desired spacing between the film and the aperture, the guide being arranged to move at substantially the same velocity as the film.

The invention further relates to a telecine machine including a film projection system as described in the preceding paragraph.

A film projection system as described in the opening paragraph is disclosed in U.K. Patent Specification No. 1349857 which shows a film transport means comprising a drive roller and a flexible belt which passes round the drive roller and a following roller and forms a guide for the film which moves at the same velocity as the film. The flexible belt is optically transparent. The flexible belt has a film receiving channel in its outer surface, the width of the channel being such that the sides thereof engage the edges of a film received in the channel.

This film projection system suffers from the disadvantage that if different sized films are to be projected e.g. 8, 16 or 35 mm it is necessary to remove the flexible belt and replace it with a different belt having a different width channel.

The invention provides a film projection system as described in the opening paragraph characterised in that the guide comprises two endless bands each having a portion which engages with respective edges of the film and that there is provided means for varying the spacing between the bands.

The provision of means for varying the spacing between the bands enables the projection system to be used for different sized films without requiring the substitution of parts of the film drive or guide mechanisms.

The bands may be located on and encircle a single turret which may be in the form of a hollow cylinder having an aperture in its curved surface.

The means for varying the spacing between the bands may comprise a carrier for each of the bands, the carriers being slidably mounted on the turret and being locatable by means of spring loaded balls engaging in indents.

The turret may be mounted on an opaque deck, the light source being located on the opposite side of the deck from the turret and light from the source being reflected through the aperture.

Sound reading transducers may be located adjacent to the guide means enabling a compact construction to be achieved.

To enable the sound transducers for both 16 mm and 35 mm films to be both located adjacent the guide means spaced rollers may be provided to enable a loop to be formed in the film between the apertures and the sound reading transducers. The use of the spaced rollers enables the different spacing between the film and sound track for the two types of film to be compensated for.

Figure 2:
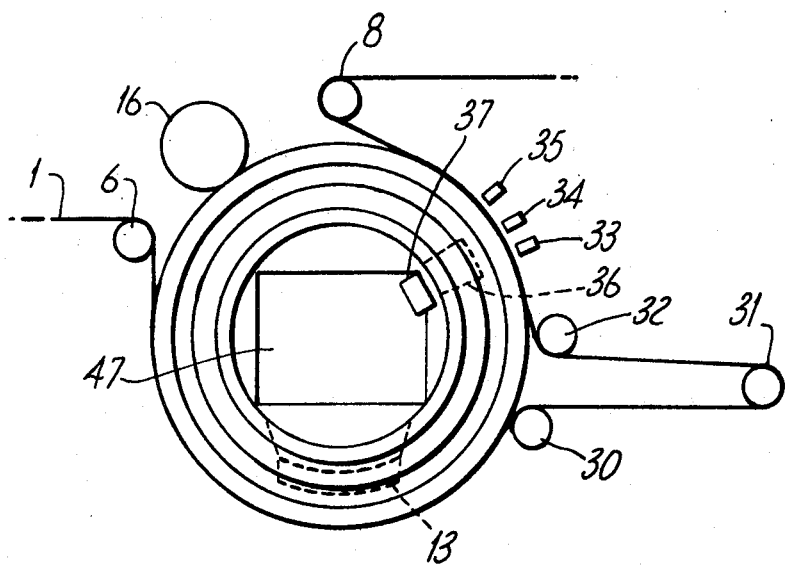
Figure 4:
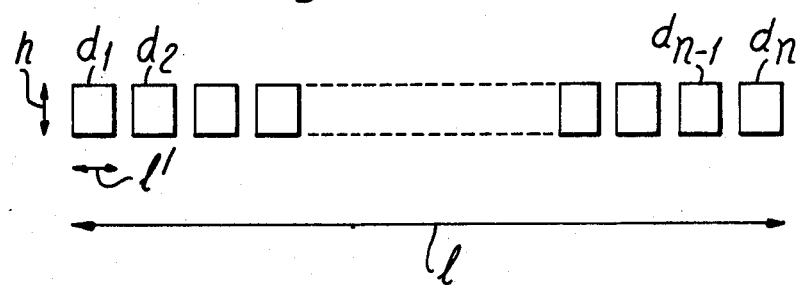
Figure 3:
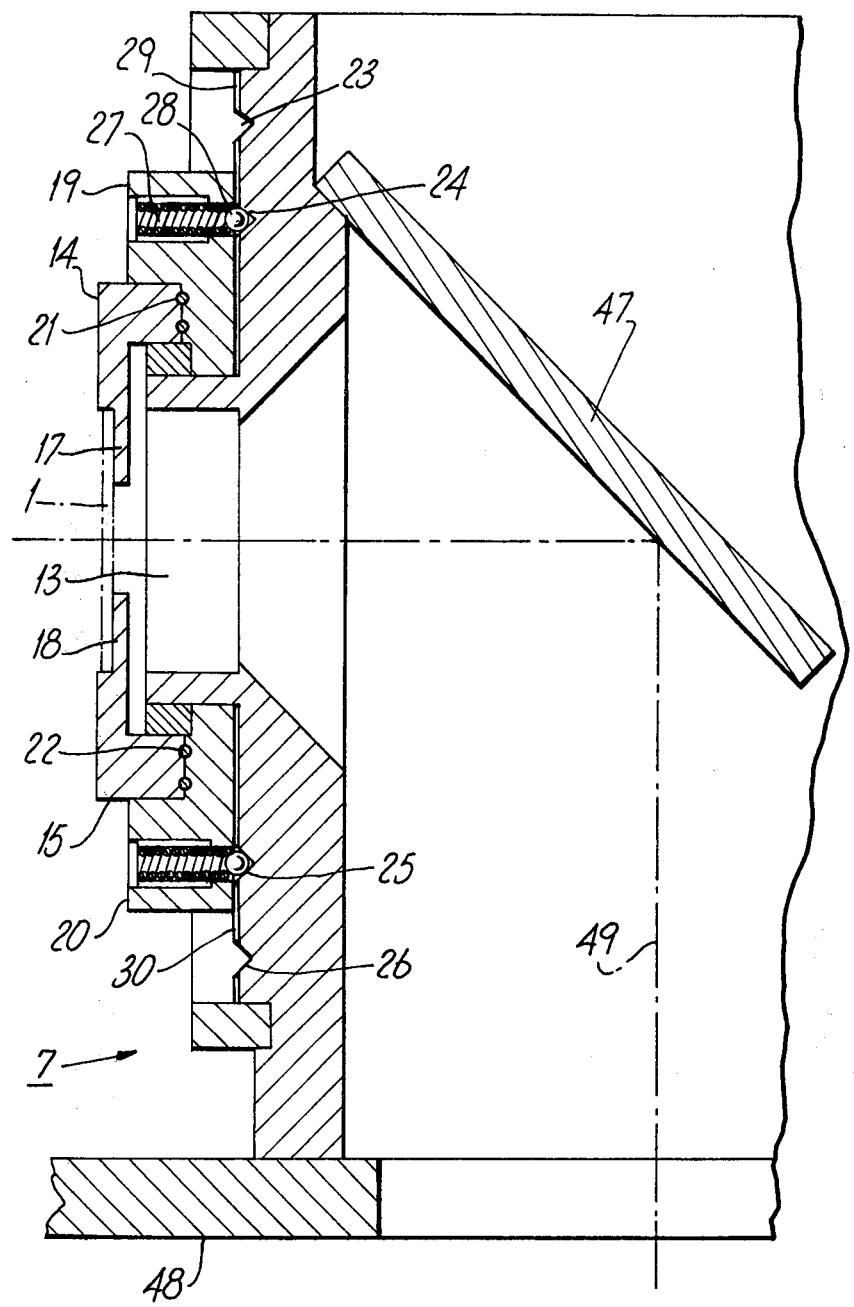

An embodiment of the invention will now be described, by way of example, with reference to the accompanying drawings, in which:

FIG. 1 is a diagrammatic plan view of telecine apparatus including a film projection system according to the invention, FIG. 2 is a plan view of the film transport mechanism of the projection system shown in FIG. 1, FIG. 3 is a sectional elevation of the lamp turret and film guide mechanism of FIG. 2, and FIG. 4 is a front view of a detector row used in the apparatus shown in FIG. 1.

FIG. 1 shows a diagrammatically telecine apparatus in which a film 1 from a reel 2 passes through a tension arm assembly 3 which comprises two rollers 4 and 5 which are biased to produce a given tension in the film. The film then passes round a further roller 6, a turret 7, roller 8, and tension arm assembly 9 comprising two rollers 10 and 11 to a take up reel 12.

The turret 7 is in the form of a hollow cylinder and as can be seen from FIG. 3 has a gate aperture 13 in its curved surface. Two endless bands 14, 15 (FIG. 3) are located on and encircle the turret 7 and are friction driven by a drive roller 16. Each of the bands has a portion which engages the respective edge of the film. The portions of the bands 14 and 15 locate the film 1 and transport the film round the turret 7 and past the gate 13. Thus the annular bands 14 and 15 act both as film transport means for continuously transporting the film in conjunction with the drive roller 16 and as a film guide in the region of the gate 13 in order to maintain a desired spacing between the film and the gate 13. A plane mirror 47 located within the turret 7 reflects light from a source (not shown), which is located under a deck 48 on which the turret is mounted, through the gate 13. The bands 14 and 15 are coated with a soft high friction material such as rubber at least over the surfaces 17 and 18 in contact with the film 1 so that there is little or no slip between the film 1 and the bands 14 and 15.

The bands 14 and 15 are mounted on carriers, formed by rings 19 and 20 respectively, ball races 21 and 22 providing a low friction bearing surface between the bands 14 and 15 and the rings 19 and 20. The rings 19, 20 are slidable on splines 29, 30 between two positions to accommodate both 16 mm and 35 mm films. In this way there is provided by the rings 19 and 20 means for varying the spacing between the bands 14 and 15. The ring 19 is located by indents 23, 24 and the ring 20 by indents 25, 26. When the rings 19 and 20 are located by the indents 24 and 25 the bands 14 and 15 are spaced for 16 mm film while when the rings 19 and 20 are located by the indents 23 and 26 the bands 14 and 15 are spaced for 35 mm film. Further indents may be provided on the turret 7 to enable the bands 14 and 15 to be spaced for any other film size.

The ring 19 is located in the indent 23 or 24 by means of a spring loaded ball assembly comprising a coil spring 27 and a ball 28. There are typically three identical assemblies located at 120° intervals round the circumference of the ring and three corresponding indents on the turret 7. The spring and ball assemblies could alternatively be located in the turret 7 with co-operating indents being formed in the rings 19 and 20.

A light source (not shown) such as an incandescent lamp is located under the deck 48 and is reflected by the mirror 47 through the gate aperture 13 onto the film 1. The chain dotted line 49 in FIG. 3 shows the path of light from the source through the gate to the detector.

As shown in FIG. 2 three further rollers 30, 31 and 32 may be provided to enable a loop of film to be formed. This enables sound transducers 33, 34 and 35 to be located adjacent to the turret 7. The transducer 33 is positioned to read an optical sound track on 35 mm film and in order that the correct synchronisation between the film and the sound track is obtained the film is taken in a loop round the rollers 30, 31 and 32. For 16 mm film the spacing between corresponding film frames and soundtrack is closer enabling the film to be taken directly round the turret to obtain the correct spacing between the transducer and the film gate.

The lower part of FIG. 1 shows an optical scanning system which enables a continuously moving film frame to be focused on a detector. In principle, the scanning system comprises a scanning mirror 123, which is pivotable about an axis 132 perpendicular to the plane of drawing, and at least one row of radiation sensitive detectors 129, which row extends perpendicularly to the plane of drawing. Furthermore, there is provided an imaging system comprising the semitransparent mirrors 120 and 124 and the concave mirrors 121 and 125.

The scanning beam 140 which passes through the film 1 is partly reflected to the concave mirror 121 by the semitransparent mirror 120. The mirror 121 reflects the incident light to the semitransparent mirror 120, which transmits a part of the beam to the scanning mirror 123. Upon reflection by the scanning mirror a part of the beam passes through the semitransparent mirror 124 and is subsequently incident on the concave mirror 125, which again reflects the beam. Via a further reflection on the semitransparent mirror 124 the scanning beam is directed to the row of detectors 129.

The concave mirrors 121 and 125 are rectangular concave mirrors, whose long axes are perpendicular to the plane of drawing. The system 120, 121, 123, 124 and 125 conjugates each point in the plane of the film gate to a separate point in the plane of detectors. Conversely, it may be said that the row of detectors is imaged on the film as a narrow strip whose longitudinal direction is transverse to the plane of drawing. Thus, at any instant a row of detectors observes only a narrow strip of a film frame being scanned. The width of this strip, hereinafter referred to as scanning line, is determined by the magnification of the system of concave mirrors 121 and 125 and by the height h of the detectors.

FIG. 4 shows a detector row 29 in front view. This row comprises a number of separate detectors $d_1$ to $d_n$, for example photodiodes, phototransistors or other photosensitive elements. The height, i.e. the dimension transverse to the plane of drawing in FIG. 1, and the magnification of the selected optical imaging system dictate the length l of the detector row. The technology used in the manufacture of the semiconductor detectors determines how many detectors, having a length l', can be realised within the length l. This also defines the number of points of a scanning line that can be resolved. The imaging optics should be such that the detectors $d_1$ to $d_n$ are separately imaged on the film.

Which line of a film frame located within the film gate is scanned at a specific instant is obviously determined by the position of the scanning mirror at this instant. FIG. 1 shows the situation in which the scanning line is in the centre of the film gate. When the mirror 123 is rotated anti-clockwise or clockwise the scanning line is moved to the left and the right respectively.

The focus of the concave mirror 121 is situated at the front of the film 1, i.e. the side where the picture information is located. Between the mirrors 121 and 125, and thus also at the location of the scanning mirror 123, the beam 140 is a parallel beam. This ensures that, independently of the position of the scanning mirror, the beam 140 is always sharply imaged on the detector row and that no magnification errors can arise.

The first part of the imaging optics by means of which an area of the sizes of two film frames is to be imaged, will always include a concave mirror 121. By means of the part of the imaging optics behind the scanning mirror only one line need be imaged. Therefore, the concave mirror 125 may be smaller than the concave mirror 121. The semitransparent mirror 124 and the concave mirror 125 may also be replaced by a preferably achromatic lens system, such as a doublet. Such a lens system can be cheaper than a mirror system. Moreover, less light is reflected in that case, so that more light is available for the detectors.

In principle, the scanning mirror 123 is a plane mirror. However, the reflecting surface of this mirror may also be slightly curved and thus function as a kind of spherical Schmidt corrector, by means of which the imaging errors of the optical mirror system can be corrected. If the elements 124 and 125 have been replaced by a lens system, steps can be taken to ensure that this lens system corrects the imaging errors of the mirror optics and the scanning mirror itself may be entirely plane.

Generally, the film to be scanned will be a colour film. In that case, as is shown in FIG. 1, a colour splitting system 126 will be included between the semitransparent mirror 124 and the detection system, and the detection system will comprise three rows 129, 130 and 131 of radiation sensitive detectors. The detector rows 130 and 131 are constructed in a similar way as is shown in FIG. 4 for the row 129. The system 126 may be constituted by a colour splitting prism containing two dichroic layers 127 and 128. The layer 127 for example only reflects the blue colour component of the incident light to the detector row 130 and transmits the rest of the light. The layer 128 for example reflects only the red colour component of the incident light to the detector row 131. After traversing the layers 127 and 128 only the green light component of the incident light is left. This component is incident on the detector row 129.

Colour separation may also be achieved with the aid of a diffraction grating in the form of a phase grating, which comprises a multitude of each time three grating grooves, which three grating grooves have different depths. Such a colour separation grating is for example described in the German Patent Application No. 2,645.075, which has been laid open for public inspection, and is not discussed in more detail. When a colour separation grating is used the three rows of detectors may be arranged adjacent each other in one plane, the rows having the same direction as the grating grooves. If the detectors comprise photo diodes, the three rows of detectors may be integrated on one substrate, so that the detection system of FIG. 1 may be replaced by a very compact system.

The optical scanning system shown in FIG. 1 is more fully described and is claimed in U.K. Patent Application No. 2044578A. Alternative scanning systems could be used to freeze the continuous motion so that individual frames of the film may be sequentially presented to a detection device. The detection device may alternatively be a television camera tube in which case it is necessary to produce a stationary image of each film frame on the active surface of the camera tube. The film projection system in accordance with the invention is not limited to use with the scanning and detection arrangement shown in FIG. 1 but may be used with any suitable scanning system such as scanning mirror, flying spot scanning or sequential to interlace conversion using a digital memory.

It is possible to interchange the positions of the light source and the scanning arrangement so that the light source is above the deck and the mirror 7 deflects the film image downwards to the detection system.

Various alternative embodiments could be constructed in accordance with the invention. For example, the bands 21 and 22 could be made from flexible materials and be located on driving and following shafts the bands being carried by pulleys which are located on the shafts by a similar means to that by which the rings 19 and 20 are located on the turrets. It may, in this case, be necessary to provide additional guide means for the bands 14 and 15 in the region of the film gate by, for example, providing guide pulleys on further shafts located adjacent to the film gate.

What is claimed is:

1. A film projection system including a light source, film transport means for continuously transporting the film past an aperture through which light from the source is directed onto a detector and a guide for guiding the film in the region of the aperture to maintain a desired spacing between the film and the aperture, the part of the guide in contact with the film being arranged to move at substantially the same velocity as the film, characterized in that in the region of the aperture the film is guided solely by guide elements which contact the film and move substantially at the velocity of the film; said guide elements are two endless bands each having a portion which engages with respective edges of the film; and that the transport means includes means for varying the spacing between the bands.

2. A film projection system as claimed in claim 1 in which the bands are located on and encircle a turret.

3. A film projection system as claimed in claim 2, in which the bands are annular and the turret is a hollow cylinder, the aperture being formed in the curved surface of the cylinder.

4. A film projection system as claimed in claims 2 or 3 in which the means for varying the spacing between the bands comprises a carrier for each of the bands, the carriers being slidably mounted on the turret and being locatable by means of spring loaded balls engaging in indents.

5. A film projection system as claimed in claim 2, in which the turret is mounted on an opaque deck, the light source being located on the opposite side of the deck from the turret and light from the source being reflected through the aperture.

6. A film projection system as claimed in claim 3 in which a sound reading transducer is located adjacent to the guide means.

7. A film projection system as claimed in claim 6, including rollers spaced to enable a loop to be formed in the film between the aperture and the sound reading transducers.

8. A film projection system as claimed in claim 3, in which the guide forms part of the film transport means and is driven by frictional contact with a driving member.

9. A telecine machine including a light source, a detector, film transport means for continuously transporting the film past an aperture through which light from the source is directed to the film, a guide for guiding the film in the region of the aperture, and an optical system for focusing light directed through the film onto the detector, characterized in that the machine comprises a cylinder in whose curved surface the aperture is formed; in the region of the aperture the film is guided solely by two endless annular bands which encircle the cylinder; said bands are mounted for rotation about the cylinder axis on respective carrier rings; and said carrier rings are axially displacable along said cylinder to accomodate film of different widths.

10. A machine as claimed in claim 9, characterized in that the light source includes means for directing light, directed axially in the cylinder, through the aperture.

11. A machine as claimed in claim 9, characterized in that said optical system is a scanning system; and that the machine further comprises a sound reading transducer located adjacent the annular guide band, and roller means which form a loop in the film between the aperture and the transducer.

12. A machine as claimed in claim 11, characterized in that said bands form part of the film transport means and are driven by friction contact with a driving member.

* * * * *